United States Patent [19]
Fujita et al.

[11] Patent Number: 6,095,895
[45] Date of Patent: Aug. 1, 2000

[54] PROCESSING JIG

[75] Inventors: Yasutoshi Fujita, Saku; Masao Yamaguchi, Komoro; Masahiro Sasaki, Saku-machi; Masaki Kozu, Saku; Kazuhiro Barada, Maruko-machi, all of Japan

[73] Assignee: TDK Corporation, Tokyo, Japan

[21] Appl. No.: 09/081,785

[22] Filed: May 20, 1998

[30] Foreign Application Priority Data

May 27, 1997 [JP] Japan ................................. 9-154515
May 7, 1998 [JP] Japan ................................. 10-124624

[51] Int. Cl.$^7$ ................................................. B24B 49/00
[52] U.S. Cl. ............................................................. 451/5
[58] Field of Search ................................. 451/5, 390, 441

[56] References Cited

U.S. PATENT DOCUMENTS 4,914,868  4/1990  Church et al. ................. 51/165.71
5,136,445  8/1992  Zak ...................................... 360/103
5,607,340  3/1997  Lackey et al. .......................... 451/5
5,620,356  4/1997  Lackey et al. .......................... 451/5

FOREIGN PATENT DOCUMENTS 2-95572  4/1990  Japan .

*Primary Examiner*—Lowell A. Larson
*Assistant Examiner*—Dermott J. Cooke
*Attorney, Agent, or Firm*—Oliff & Berridge, PLC

[57] ABSTRACT

A processing jig comprises a main body including a material retainer for retaining a magnetic head material at the lower end thereof. The main body has a hole for fixing in its longitudinal mid-section and in a position above the middle along the vertical direction. A bolt is inserted into the hole for fixing the main body to a jig fixing plate of the processing apparatus. The jig is fixed to the processing apparatus with the bolt inserted into the hole only at the one point in the longitudinal mid-section.

20 Claims, 12 Drawing Sheets

PROCESSING JIG

BACKGROUND OF THE INVENTION

1. Field of the Invention

The present invention relates to a processing jig for holding an object processed with a processing apparatus.

2. Description of the Related Art

A thin film head and a magnetoresistive (MR) head are generally used as a magnetic head for a hard disk device. A thin film head is made up of a combination of a magnetic thin film and flat coils. An MR head uses a magnetoresistive element (MR element). An MR head is used for replay only and usually takes the form of a composite head integrated with a thin film head for recording.

A magnetic head for a hard disk device is made up of a magnetic head element formed at the trailing end of a slider floating slightly above the surface of a hard disk when rotating.

Magnetic heads such as a thin film head and an MR head described above are generally made through semiconductor manufacturing techniques. The manufacturing process of magnetic heads usually includes the steps of wafer formation, processing (machining) and assembly. In the wafer formation step a wafer as a substrate on which thin films are formed is made. Thin films such as magnetic poles, coils, insulating layers, protection layers are then formed on the wafer. In the processing step the wafer on which thin films are formed is cut into magnetic head materials. The magnetic head materials are ground and polished to form sliders each including a magnetic head element. The sliders are each mounted on a suspension in the assembly step.

An example of the processing step will now be described. In the processing step a wafer on which thin films are formed is cut in one direction to form bar-like magnetic head materials. Each bar-like magnetic head material is fixed to a jig to be processed through lapping and so on. The bar-like magnetic head material includes a plurality of magnetic head elements arranged in a line. The bar-like magnetic head material is divided into individual sliders, having been processed through lapping, polishing and so on. In such a processing step it is required that a throat height and an MR element height of every magnetic head element included in the bar-like magnetic head material fall within a certain limited tolerance. It is required as well that the profile irregularity of the surface processed falls within a specific permissible range.

An apparatus for performing such a processing step is disclosed in U.S. Pat. No. 5,620,356. A jig for processing magnetic heads is disclosed in U.S. Pat. No. 5,607,340. A lapping control apparatus in disclosed in Japanese Patent Laid-open No. 2-95572 (1990) for controlling a throat height through observing a resistance of an MR element.

As shown in U.S. Pat. Nos. 5,620,356 and 5,607,340 mentioned above, a jig of related art is fixed to a processing apparatus at two points in a horizontal direction. However, there may be a difference in level between the two points in the processing apparatus to which the jig is fixed. Furthermore the two points may not be adequately parallel to each other. No matter how minute, such a difference in level and bad parallelism are significantly large compared to the profile irregularity tolerable for the surface processed of the magnetic head material. Accordingly, such a jig of related art has a problem that a difference in level and bad parallelism between the two points in the processing apparatus to which the jig is fixed affect the profile regularity, flatness in particular, of the surface processed of the magnetic head material. Consequently yields of magnetic heads are reduced while inspection steps for magnetic heads are required to be increased.

SUMMARY OF THE INVENTION

It is an object of the invention to provide a jig used for processing an object for improving the profile regularity of the surface processed of the object processed with a processing apparatus and for improving yields of objects and reducing inspection steps for the objects.

A processing jig of the invention is such a jig fixed to a processing apparatus and retaining an object to be processed with the processing apparatus. The jig comprises a main body including a retainer for retaining the object; and a fixing section provided only in one position in the main body for fixing the main body to the processing apparatus. The fixing section may be provided in the longitudinal mid-section of the main body. The fixing section may be a hole to which a fixture is inserted for fixing the main body to the processing apparatus.

The processing jig of the invention preferably further comprises a means or section for preventing the main body from rotating about the fixing section, provided in the main body. The means or section for preventing includes one engaging section or more in which one rotation preventing member or more provided in the processing apparatus is engaged. The fixing section may be provided in the longitudinal mid-section of the main body. The means or section for preventing may include a plurality of engaging sections provided in a plurality of positions symmetrical with respect to the midpoint across the length of the main body.

According to the processing jig of the invention, the main body of the jig is fixed to the processing apparatus with the fixing section provided only in the one position in the main body. With the means or section for preventing rotation, the main body of the jig of the invention is prevented from rotating about the fixing section.

Other and further objects, features and advantages of the invention will appear more fully from the following description.

DETAILED DESCRIPTION OF THE PREFERRED EMBODIMENT

Figure 3:
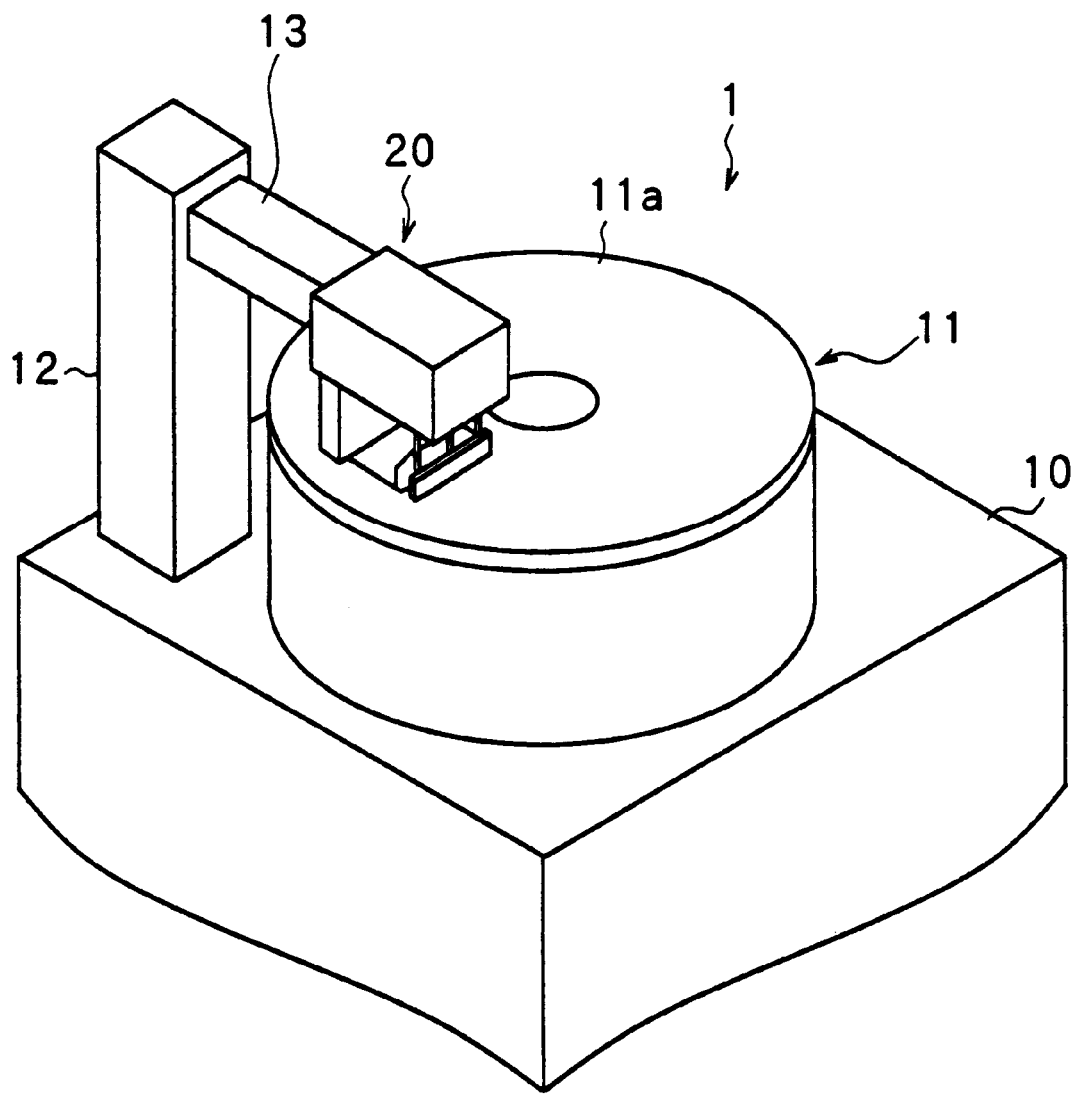
FIG. 3 is a schematic perspective view of a processing apparatus wherein the jig of the first embodiment of the invention is used.

Preferred embodiments of the invention will now be described in detail with reference to the accompanying drawings. An example of a processing apparatus wherein a processing jig of a first embodiment of the invention will be first described. FIG. 3 is a schematic perspective view of the processing apparatus. The processing apparatus 1 is an apparatus for lapping a magnetic head material. The processing apparatus 1 comprises: a table 10; a rotating lapping table 11 provided on the table 10; a strut 12 provided on the table 10 by the side of the rotating lapping table 11; and a material retainer 20 attached to the strut 12 through an arm 13. The rotating lapping table 11 has a lapping surface 11a to come into contact with a magnetic head material.

Figure 4:
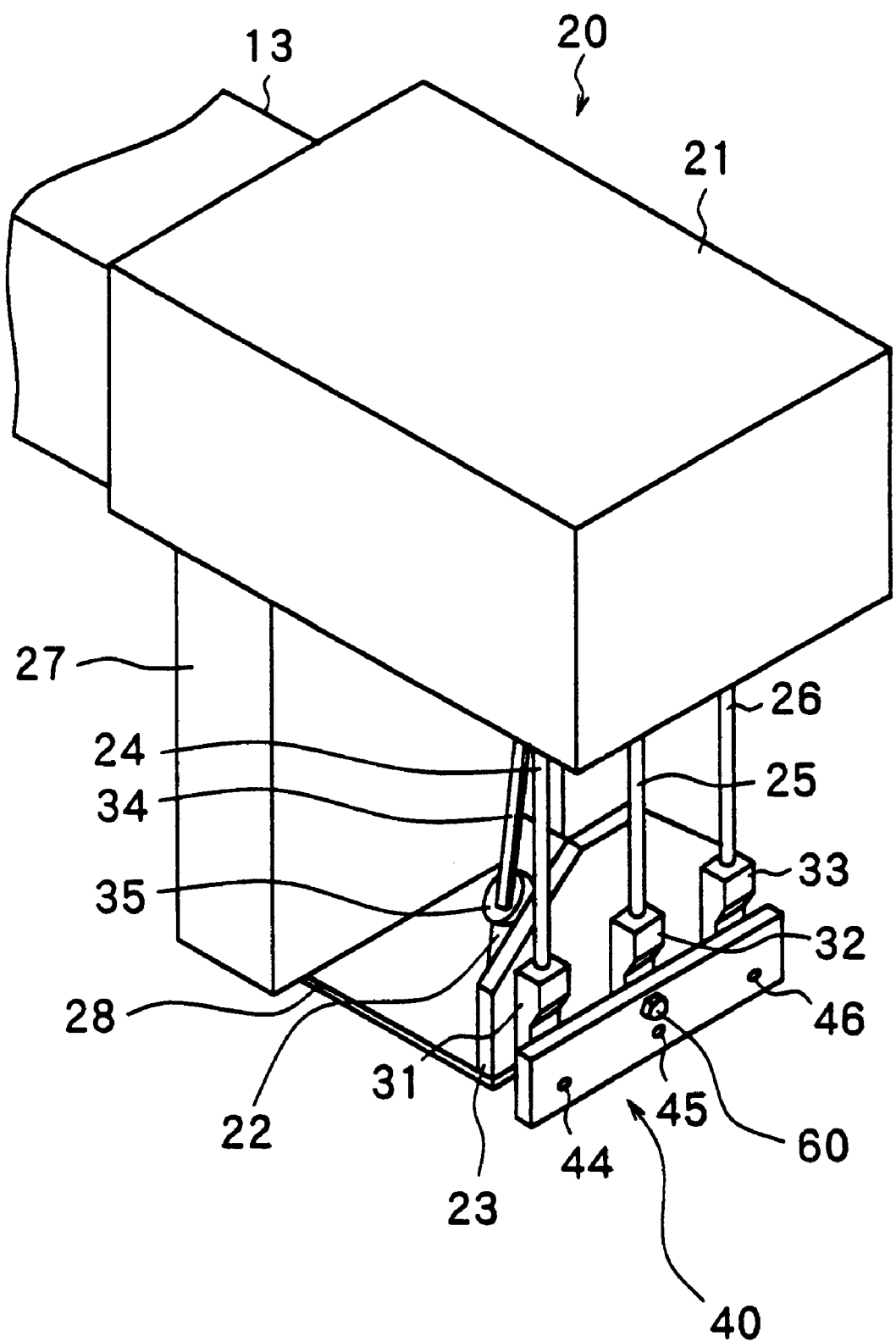
FIG. 4 is a perspective view making the material retainer of the processing apparatus shown in FIG. 3.

FIG. 4 is a perspective view magnifying the material retainer 20 of the processing apparatus 1 shown in FIG. 3. The material retainer 20 comprises: a retainer body 27 coupled to the arm 13; a base 22 placed in front of the retainer body 27 and coupled to an actuator provided in the retainer body 27 through an arm; a jig fixing plate 23 placed in front of the base 22; and three pressuring rods 24, 25 and 26 placed in front of the jig fixing plate 23 uniformly spaced and each coupled through an arm to an actuator fixed to the base 22. A cover 21 covers the upper part of the retainer body 27, the base 22 and the pressurizing rods 24, 25 and 26. The base 22 is coupled through an arm not shown to the actuator provided in the retainer body 27. The base 22 is vertically movable through driving the actuator. The lower end of the jig fixing plate 23 is coupled through a plate spring 28 to the lower end of the retainer body 27. The jig fixing plate 23 is thus prevented from tilting.

The pressurizing rod 24 is coupled through the arm 34 and the like to an actuator 35 fixed to the base 22 so as to be vertically movable through driving the actuator 35. The rest of the pressurizing rods 25 and 26 are each vertically movable as well by means of a similar mechanism.

Pressurizing members 31, 32 and 33 are each coupled to the lower ends of the pressurizing rods 24, 25 and 26, respectively. A jig 40 for processing magnetic heads of the embodiment takes the form of plate long sideways, placed in front of the pressurizing members 31, 32 and 33. The jig 40 is fixed to the jig fixing plate 23 with a bolt 60 as a fixture at a point in the center in the direction of length (a longitudinal mid-section) through a jig fixing pin 61 described below. The jig 40 has three holes 44, 45 and 46 for pressurizing, arranged along the direction of length in the positions corresponding to the pressurizing members 31, 32 and 33, respectively. Pressurizing pins each provided at the front ends of the pressurizing members 31, 32 and 33, respectively, are inserted to the holes 44, 45 and 46, respectively. Through moving the pressurizing rods 24, 25 and 26 vertical, a force is applied to the jig 40 independently in the positions of the holes 44, 45 and 46 through each of the pressurizing pins.

Figure 1:
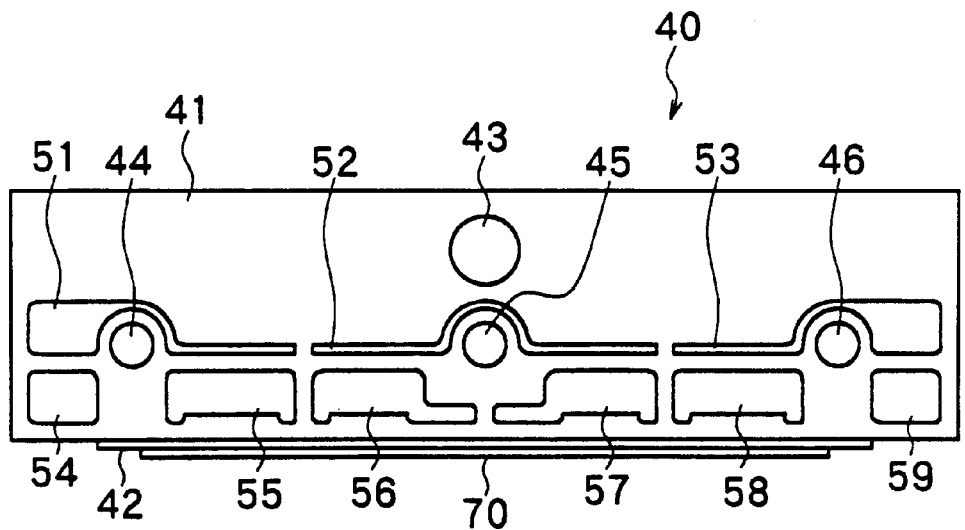
FIG. 1 is a front view of a jig of a first embodiment of the invention.
Figure 2:
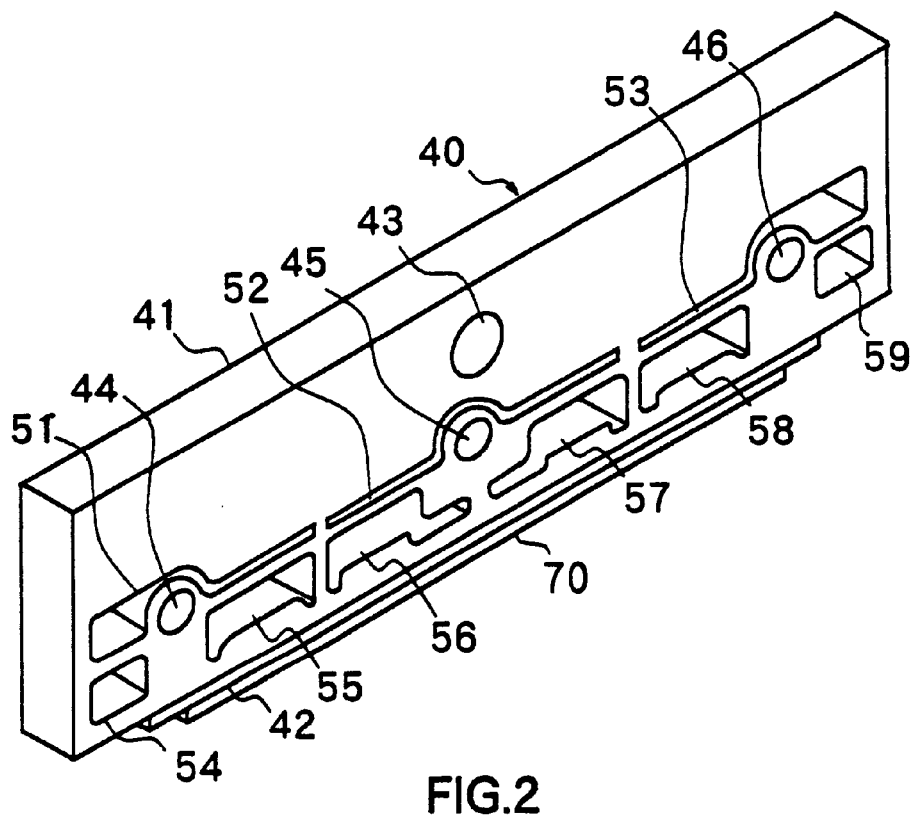
FIG. 2 is a perspective view of the jig of the first embodiment of the invention.

The structure of the jig 40 will now be described. FIG. 1 is a front view of the jig 40. FIG. 2 is a perspective view of the jig 40. As shown in the figures, the jig 40 comprises a main body 41 having a material retainer 42 for retaining a magnetic head material 70 at the lower end thereof. The magnetic head material 70 is fixed to the material retainer 42 through bonding, for example. The main body 41 has a hole 43 for fixing in the center along the direction of length (the longitudinal mid-section) and in a position above the center along the vertical direction. The bolt 60 is inserted into the hole 43 for fixing the main body 41 to the jig fixing plate 23 of the processing apparatus 1. The main body 41 further has the pressurizing holes 44, 45 and 46 described above, arranged along the direction of length in positions below the center along the vertical direction.

The main body 41 further has a plurality of slots 51 to 59 for deforming in positions in the center to the lower end along the vertical direction. The slots 51 to 69 and thin parts of the main body 41 between the slots are appropriately deformed in response to a force independently applied to the positions of the pressurizing holes 44, 45 and 46, respectively as described above, and absorb a pressure. The jig 40 is thereby deflected.

The main body 41 is made of stainless steel or a ceramic such as zirconia ($ZrO_2$) or alumina ($Al_2O_3$), for example.

Figure 5:
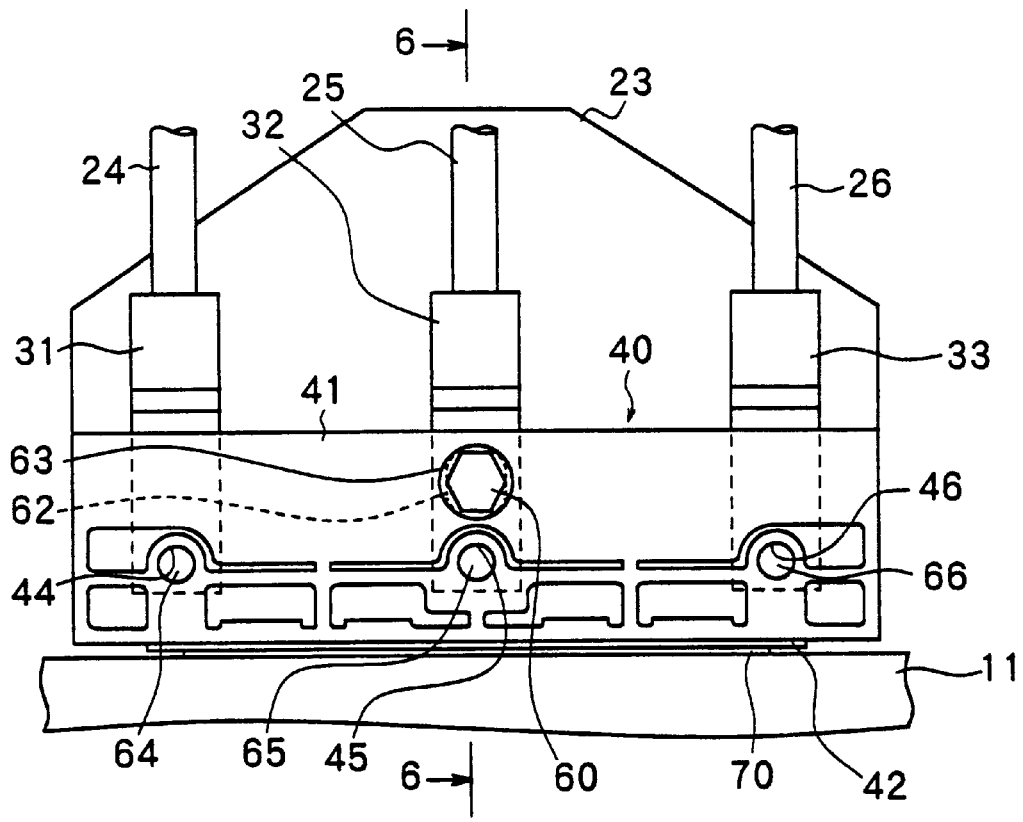
FIG. 5 is a front view of the jig of the first embodiment of the invention fixed to the processing apparatus.
Figure 6:
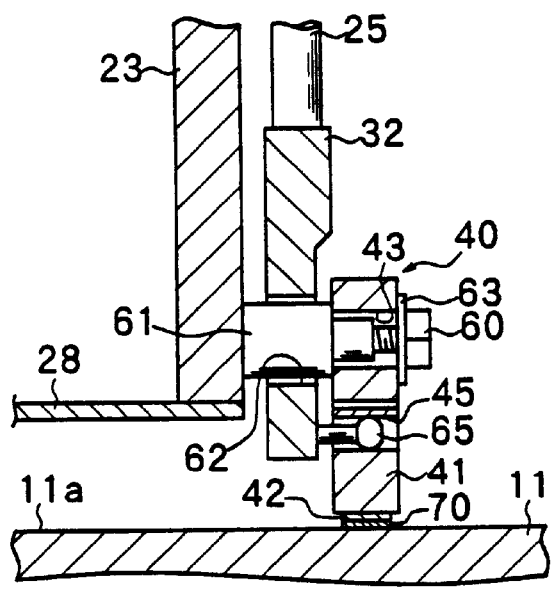
FIG. 6 is a cross section taken along line 6—6 in FIG. 5.

The way the jig 41 is fixed to the processing apparatus 1 shown in FIG. 3 will now be described. FIG. 5 is a front view of the jig 40 fixed to the processing apparatus 1. FIG. 6 is a cross section taken along line 6—6 in FIG. 5. As shown in the figures, the jig 40 is placed in front of the pressurizing members 31, 32 and 33. In front of the jig fixing plate 23 a jig fixing pin 61 is provided in the positions corresponding to the hole 43 of the jig 40. The pressurizing member 32 has a longitudinal slot 62 in the position corresponding to the jig fixing pin 61. The jig fixing pin 61 is inserted to the slot 62 so that the pressurizing member 32 is capable of moving vertically by a given range. The jig fixing pin 61 passes through the slot 62 and the tip thereof is inserted into the hole 43 of the jig 40. The base of the jig fixing pin 61 is large and the tip thereof is small in diameter. The step between the base and the tip is brought into contact with the periphery of the hole 43 of the main body 41. An internal thread is cut inside the jig fixing pin 61 from the tip. The bolt 60 is inserted through a washer 63 into the hole 43 from the front of the jig 40. The bolt 60 is then screwed into the internal thread of the jig fixing pin 61 so that the jig 40 is fixed to the jig fixing plate 23.

Pressurizing pins 64, 65 and 66 are provided in the positions corresponding to the pressurizing holes 44, 45 and 46, respectively, of the jig 40 at the front ends of the pressurizing members 31, 32 and 33, respectively. The pressurizing pins 64, 65 and 66 are each inserted into the holes 44, 45 and 46, respectively.

The jig 40 retaining the magnetic head material 70 is fixed to the processing apparatus 1 as described above and placed so that the surface to be processed of the magnetic head material 70 comes into contact with the lapping surface 11a of the rotating lapping table 11. In this state the pressurizing rods 24, 25 and 26 are vertically moved so that a force is applied to the jig 40 independently in the positions of the holes 44, 45 and 46 through the pressurizing pins 64, 65 and 66, respectively. The jig 40 is thereby deflected. This allows a bow of the magnetic head material 70 when lapped to be corrected.

Figure 7:
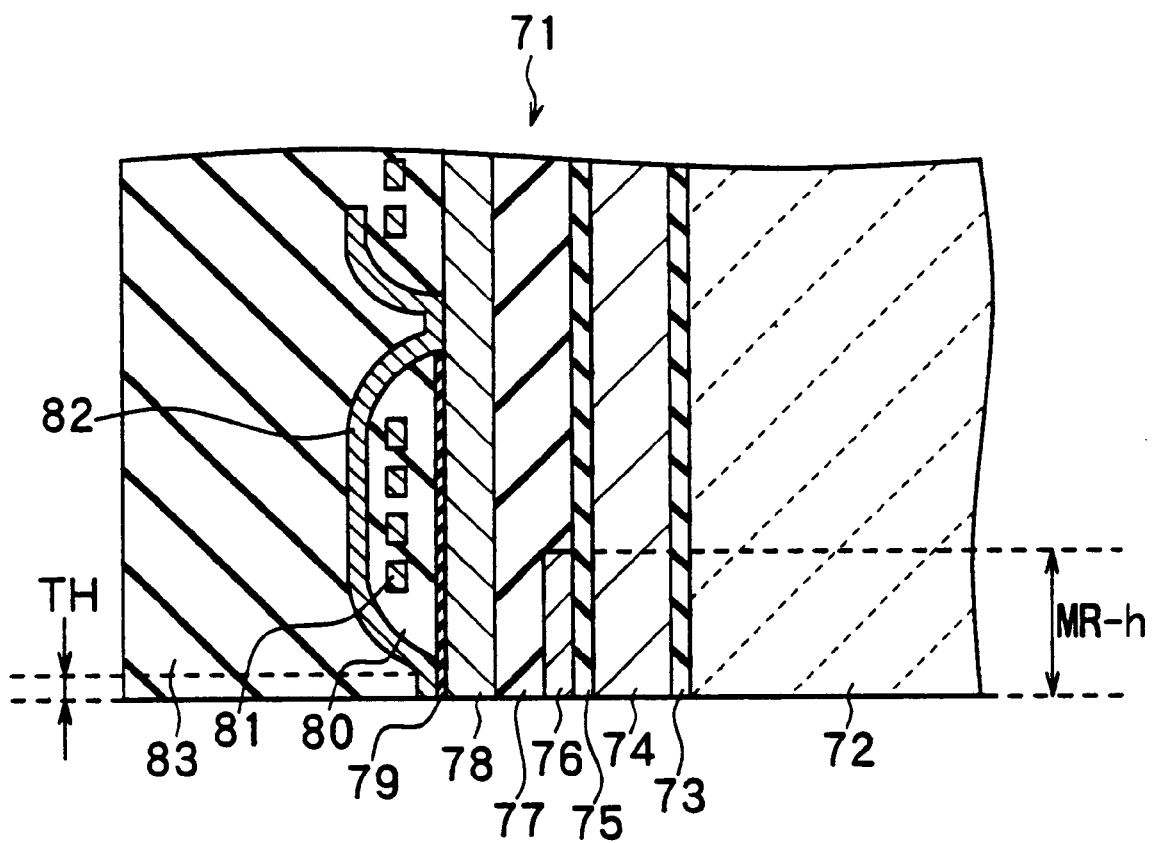
FIG. 7 is a cross section for illustrating an example of a magnetic head element.

The magnetic head material 70 is formed through cutting a wafer in one direction on which thin films are formed. The magnetic head material 70 includes a plurality of magnetic head elements arranged in a line. FIG. 7 shows a composite head as an example of a magnetic head element wherein an MR head and a thin film head for recording are combined. The magnetic head element 71 of this example comprises a base layer 73, a lower shield layer 74, a lower insulator 75, an MR element 76 and an upper insulator 77, an upper shield-cum-lower magnetic pole 78, a gap layer 79, an insulator 80 and a coil 81, an upper magnetic pole 82 and a protection layer 83, formed on a substrate (wafer) 72.

The substrate 72 is made of aluminum oxide and titanium carbide ($Al_2O_3$-TiC), for example. The base layer 73, the lower insulator 75, the upper insulator 77, the protection layer 83 and the gap layer 79 are made of $Al_2O_3$, for example. The lower shield layer 74, the upper shield-cum-lower magnetic pole 78 and the upper magnetic pole 82 are made of NiFe, for example. The insulator 80 is made of photoresist, for example. The coil 81 is made of Cu, for example.

The lower surface of the magnetic head element 71 in FIG. 7 is the surface to be lapped with the processing apparatus 1 shown in FIG. 3. While lapping, the processing apparatus 1 performs control so that throat height TH and height of the MR element MR-h of every magnetic head element 71 included in the magnetic head material 70 fall within a certain limited tolerance. Such control is performed through observing the resistance of an electrical lapping guide (ELG) and the MR element 76 as disclosed in Japanese Patent Laid-open 2-95572 (1990), for example. The electrical lapping guides are, for example, formed on the substrate 72 when the magnetic head element 71 is formed so as to be placed at both ends of the magnetic head material 70 along the direction of length.

Figure 8:
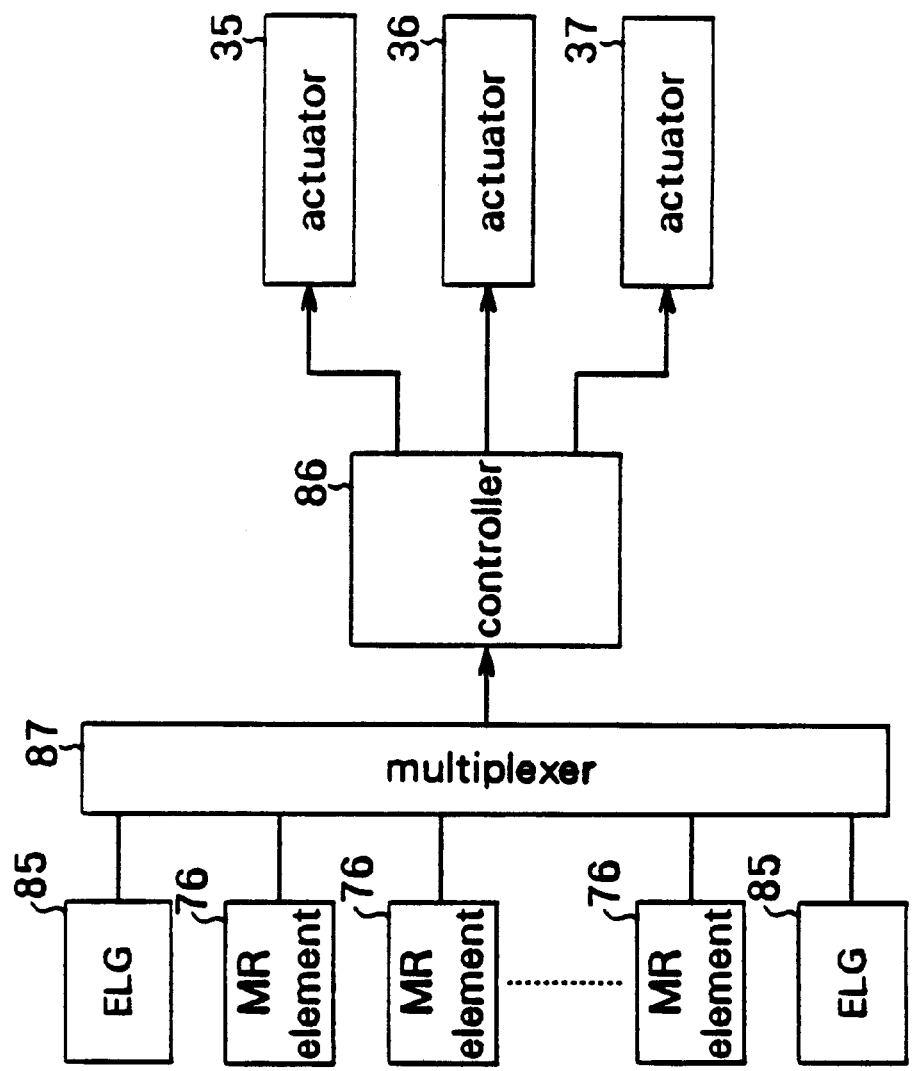
FIG. 8 is a block diagram showing an example of circuit configuration of the processing apparatus.

FIG. 8 is a block diagram showing an example of circuit configuration in a processing apparatus for controlling lapping by observing the resistance of electrical lapping guides and MR elements. The processing apparatus of this example comprises a controller 86 for controlling actuators 35, 36 and 37 driving the pressurizing rods 24, 25 and 26, respectively, through observing the resistance of electrical lapping guides (ELG) 85 and the MR elements 76 in the magnetic head material 70; and a multiplexer 87 connected to the plurality of electrical lapping guides 85 and the MR elements 76 in the magnetic head material 70 for selectively connecting one of the electrical lapping guides 85 and the MR elements 76 to the controller 86.

In the processing apparatus the controller 86 controls the actuators 35, 36 and 37 through the multiplexer 87 by observing the resistance of the electrical lapping guides 85 in the magnetic head material 70. The controller 86 first performs coarse control by observing the resistance of the electrical lapping guides 85. The controller 86 then performs control by observing the resistance of the MR elements 76 so that the throat height TH and height of the MR device MR-h of every magnetic head element 71 fall within a certain limited tolerance.

As described so far, the jig 40 of the embodiment has the hole 43 at the one point in the center of the main body 41 in the direction of its length. The bolt 60 is inserted into the hole 43 for fixing the main body 41 to the jig fixing plate 23 of the processing apparatus 1. The jig 40 is thus fixed to the jig fixing plate 23 of the processing apparatus 1 with the bolt 60 inserted into the hole 43 only at the one point in the center of the body 41 in the direction of its length. As a result, with the jig 40 of the embodiment the profile regularity of the surface processed of a magnetic head material fixed to the jig to be processed will not be affected by a difference in level between two positions in the processing apparatus to which the jig is fixed and bad parallelism as a jig of related art fixed to a processing apparatus in two positions. Therefore the jig 40 of the embodiment improves the profile regularity, flatness in particular, of the surface processed of the magnetic head material 70 processed with the processing apparatus 1 and improves yields of magnetic heads and reduces inspection steps for magnetic heads.

Flatness of a magnetic head (slider) is indicated with parameters such as crown, camber and twist as shown in U.S. Pat. No. 5,136,445. Comparison is made between measurements taken for the magnetic head material 70 processed with the jig 40 of the embodiment and processed with a jig of related art. Twist, in particular, of the magnetic head material 70 processed with the jig 40 is significantly improved.

Figure 9A:
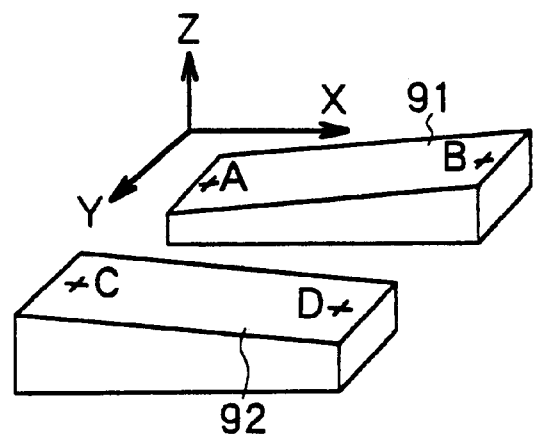
FIG. 9A and FIG. 9B are explanatory views for illustrating a twist.
Figure 9B:
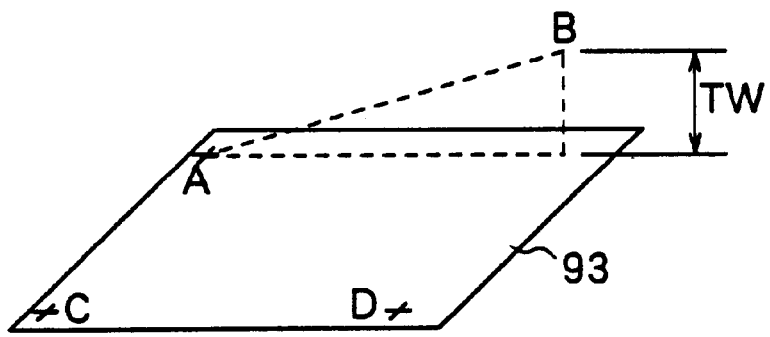

Referring now to FIG. 9A and FIG. 9B, twist will be briefly described. FIG. 9A schematically illustrates two rails 91 and 92 of a slider. Twist is obtained as follows. First the least square plane is calculated for each of the rails 91 and 92 and four points A to D are determined as shown in FIG. 9A. Points A and B are specific points near both ends of the least square plane of the rail 91. Points C and D are specific points near both ends of the least square plane of the rail 92. Next, as shown in FIG. 9B, twist TW is determined as a distance between point B and a plane 93 formed with three points A, C and D. Twist is positive when point B is positioned above the plane 93 in the direction of the Z axis.

Figure 10:
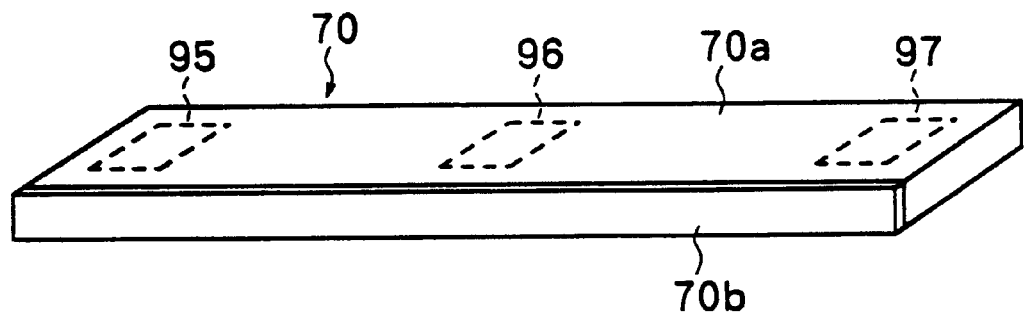
FIG. 10 is an explanatory view for illustrating areas where twist angles are measured.

As shown in FIG. 10, twist measurement is taken in three areas 95, 96 and 97 in one magnetic head material 70, at one end, in the center and at the other end, respectively, on a processed surface 70a. The instrument used for measuring is 'L-FT-10B' manufactured by Tokyo Seimitsu Co., Ltd. Numeral 70b in FIG. 10 indicates the integrated surface where the magnetic head elements 71 are formed.

Measurements are taken for forty of magnetic head materials 70 processed with the jig 40 of the embodiment and another forty processed with a jig of related art. The mean value of twist and standard deviation of 120 twist data thereby obtained for each case are as follows. With the related art jig the mean value is 3.3 nm and the standard deviation is 6.12 nm. With the jig 40 of the embodiment the mean value is 0.4 nm and the standard deviation is 1.44 nm. This result shows that twist is significantly reduced with the jig 40 of the embodiment of the invention compared to the jig of related art.

It has been known that damage such as scratches and chips may result on a surface of a jig contacting a processing apparatus. Such damage reduces the quality of magnetic heads fixed to a jig to be processed. The jig 40 of the embodiment has the main body 41 with a symmetrical shape. The holes 43 to 46 and the slots 51 to 59 of the main body 41 are arranged in symmetry as well. Therefore the jig 40 has no right-side up. As a result, if any damage is found on one side of the main body of the jig 40, the other side is faced to the processing apparatus. It is thus possible to improve the quality and yields of magnetic heads and to prolong the lifetime of the jig 40.

Figure 11:
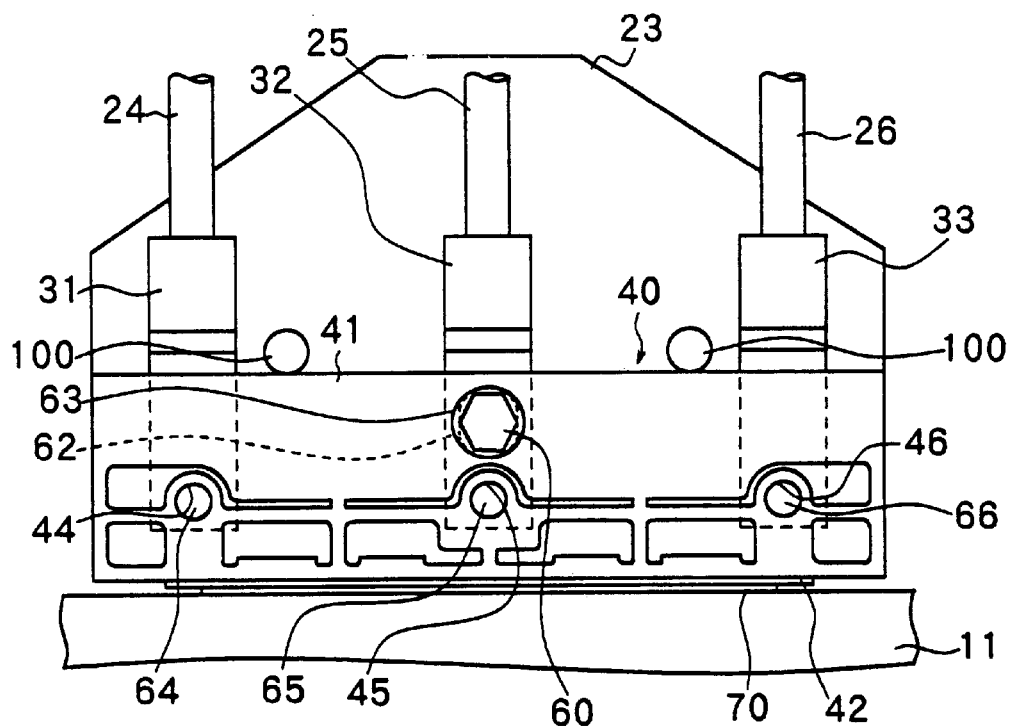
FIG. 11 is a front view of the jig of the first embodiment of the invention fixed to a processing apparatus having guide pins.

In this embodiment, as shown in FIG. 11, guide pins 100 may be provided, with which the top end of the jig 40, for example, is brought into contact, on the front of the jig fixing plate 23. It is preferable that the guide pins 100 are provided in laterally symmetrical two positions as shown in FIG. 11. Without any alteration to the jig 40, such guide pins 100 are brought into contact with the top end of the jig 40, for example, and prevent the main body 41 from rotating about the hole 43.

Figure 12:
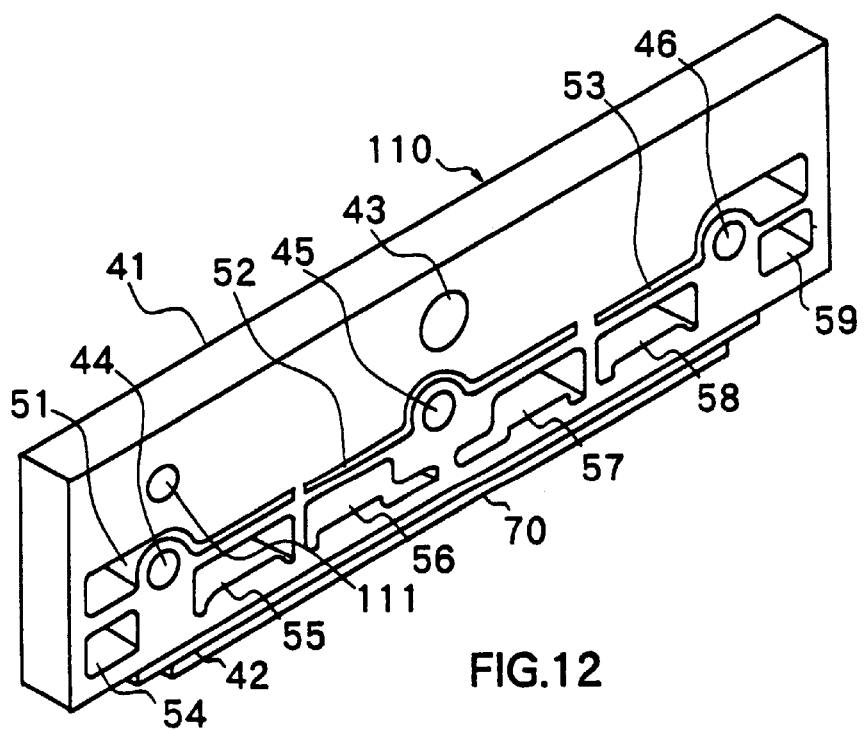
FIG. 12 is a perspective view of a jig of a second embodiment of the invention.
Figure 13:
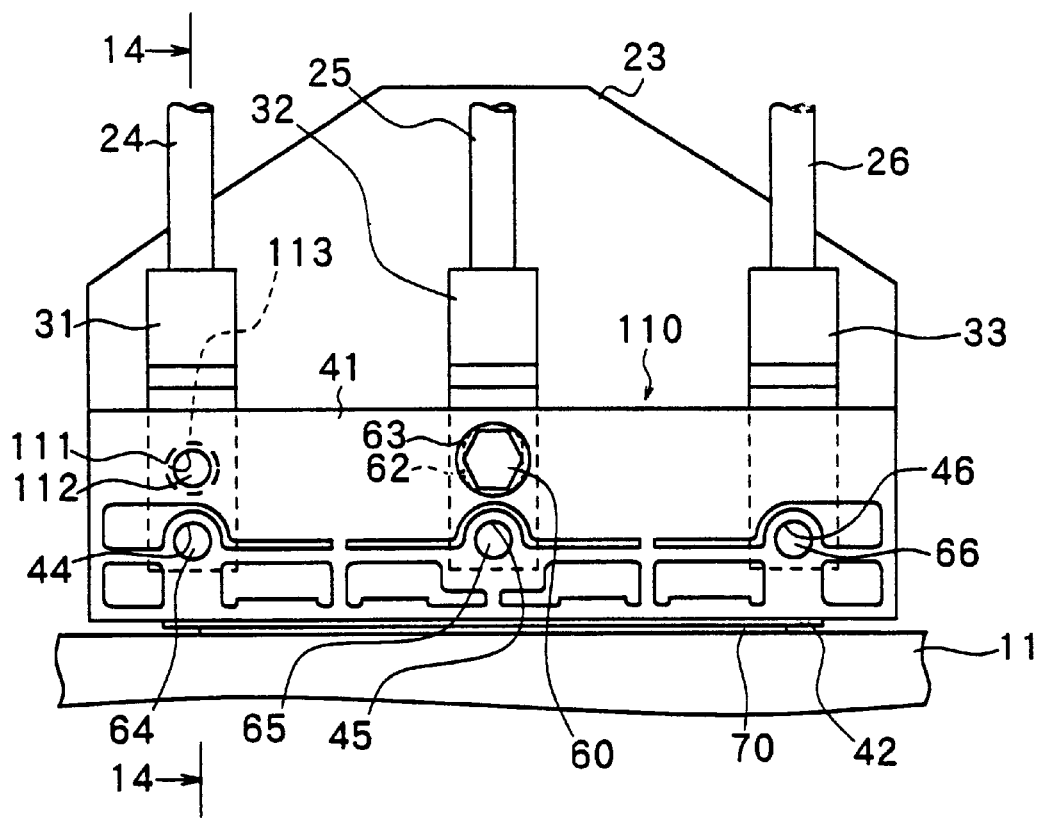
FIG. 13 is a front view of the jig of the second embodiment of the invention fixed to the processing apparatus.
Figure 14:
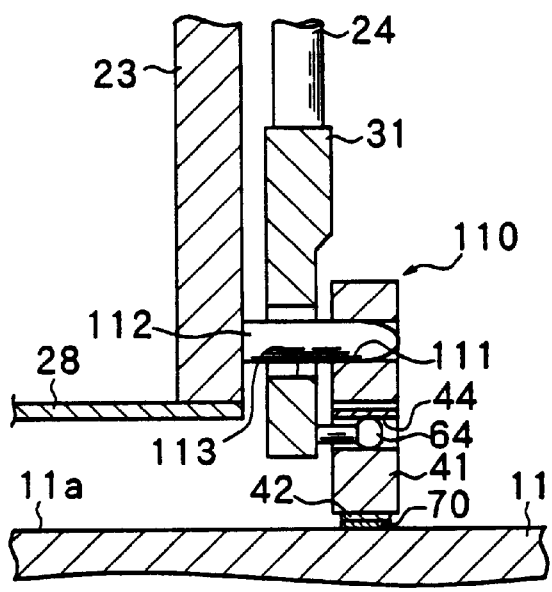
FIG. 14 is a cross section taken along line 14—14 in FIG. 13.

FIG. 12 to FIG. 14 illustrate a second embodiment of the invention. FIG. 12 is a perspective view of a jig of the embodiment. FIG. 13 is a front view of the jig of the embodiment fixed to a processing apparatus. FIG. 14 is a cross section taken along line 14—14 in FIG. 13.

As shown in FIG. 12, a jig 110 of the embodiment has a hole 111 for a guide pin, formed in the position above the hole 44 in the main body 41. The hole 111 is provided as an engagement of a rotation preventing section or a means for preventing rotation of the main body 41 about the hole 43. The hole 111 is smaller than the hole 43 in diameter. The remainder of configuration of the jig 110 of the embodiment is similar to that of the jig 40 of the first embodiment.

Furthermore, in the processing apparatus 1 wherein the jig 110 of the embodiment is used, as shown in FIG. 13 and FIG. 14, a guide pin 112 is provided on the front of the jig fixing plate 23 in the position corresponding to the hole 111 in the jig 110. The guide pin 112 corresponds to the hole 111 in diameter. The pressurizing member 31 has a hole 113, through which the guide pin 112 is inserted, in the position corresponding to the guide pin 112 so that the pressurizing member 31 is allowed to move vertically by a given distance. The guide pin 112 passes through the hole 113 and the tip thereof is inserted into the hole 111 in the jig 110.

The jig 110 of the embodiment thus prevents the main body 41 from rotating about the hole 43 by means of the guide pin 112 of the processing apparatus 1 engaged with the hole 111.

In the jig 110 of the embodiment the hole 111 and the guide pin 112 do not allow the main body 41 to be completely fixed to the processing apparatus 1 but only comes to contact with each other with the inner periphery of the hole 111 and the outer periphery of the guide pin 112. Therefore the hole 111 and the guide pin 112 do not affect the profile regularity of the surface to be processed of the magnetic head material 70 fixed to the jig 110.

Since the jig 110 of the embodiment is laterally asymmetrical, the jig 110 can be used with only one side up, contrary to the jig 40 of the first embodiment. The remainder of operation and effects of the second embodiment are similar to those of the first embodiment.

Figure 15:
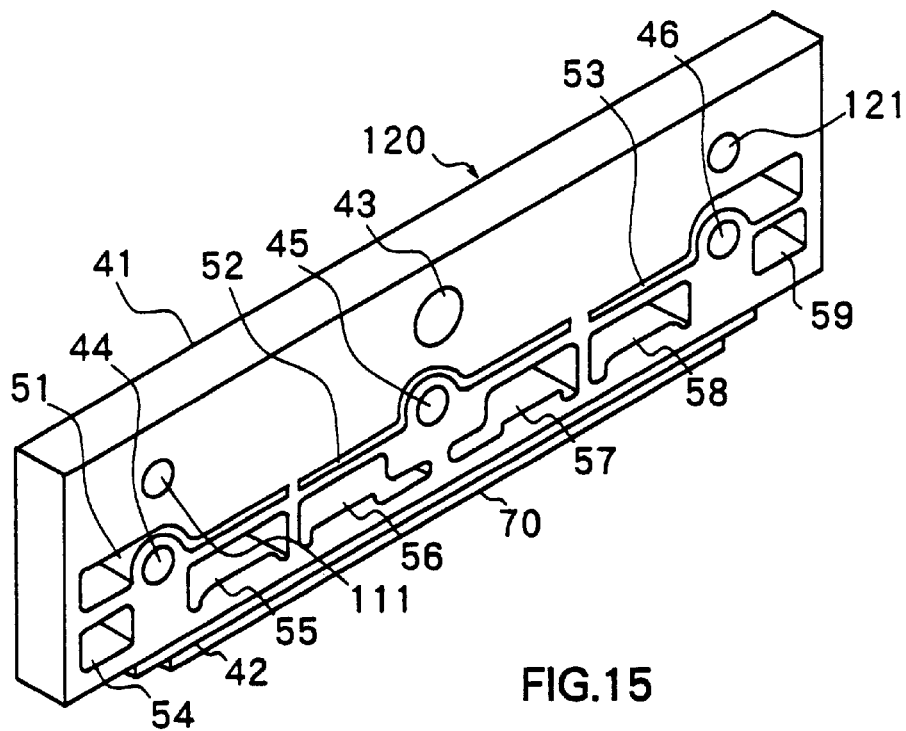
FIG. 15 is a perspective view of a jig of a third embodiment of the invention.

FIG. 15 is a perspective view of a jig of a third embodiment of the invention. As in the second embodiment, a jig 120 of the embodiment has the hole 111 in the position above the hole 44 in the main body 41. The jig 120 further has a hole 121, similar to the hole 111 in diameter, in the position above the hole 46 in the main body 41. The remainder of configuration of the jig 120 of the embodiment is similar to that of the jig 40 of the first embodiment.

Furthermore, in the processing apparatus 1 wherein the jig 120 of the embodiment is used, as in the second embodiment, the guide pin 112 is provided on the front of the jig fixing plate 23 in the position corresponding to the hole 111 in the jig 120. In addition, another guide pin not shown, corresponding to the hole 121 in diameter, is provided on the front of the jig fixing plate 23 in the position corresponding to the hole 121 in the jig 120. The pressurizing member 33 has a hole, through which the guide pin is inserted, in the position corresponding to the guide pin so that the pressurizing member 33 is allowed to move vertically by a given distance. The guide pin passes through the hole and the tip thereof is inserted to the hole 121 in the jig 120. One of the guide pins may be only provided to be inserted into either the hole 111 or the hole 121. The cross-sectional structure of the joint between the jig 120 and the processing apparatus 1, including the hole 121, is similar to that shown in FIG. 14.

The jig 120 of the embodiment is laterally symmetrical and therefore has no right-side up, as in the first embodiment. As a result, if any damage is found on one side of the main body 41, the other aide is faced to the processing apparatus. It is thus possible to improve the quality and yields of magnetic heads and to prolong the lifetime of the jig 120. The remainder of operation and effects of the third embodiment are similar to those of the second embodiment.

Figure 16:
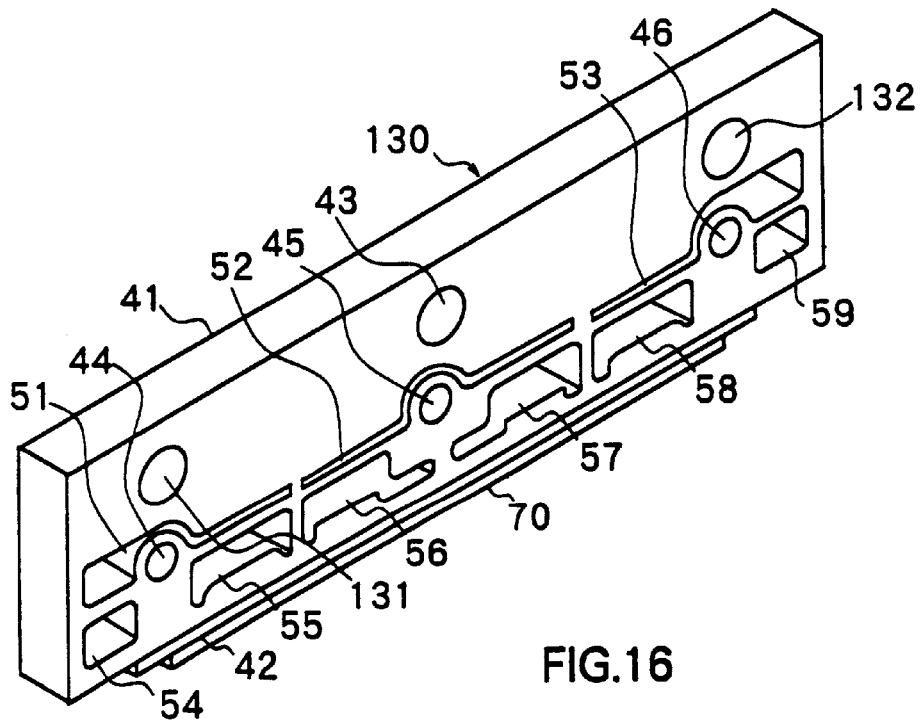
FIG. 16 is a perspective view of a jig of a fourth embodiment of the invention.

FIG. 16 is a perspective view of a jig of a fourth embodiment of the invention. A jig 130 of the embodiment has holes 131 and 132 for guide pins instead of the holes 111 and 121 in the third embodiment in the positions similar to the holes 111 and 121. The holes 131 and 132 are each similar to the hole 43 in diameter. The remainder of configuration of the jig 130 of the embodiment is similar to that of the jig 40 of the first embodiment.

Furthermore, in the processing apparatus 1, wherein the jig 130 of the embodiment is used, guide pins not shown, corresponding to the holes 131 and 132 in diameter, are provided on the front of the jig fixing plate 23 in the position corresponding to the holes 131 and 132 in the jig 130. The pressurizing members 31 and 33 each have a hole, through which each guide pin is inserted, in the position corresponding to each guide pin so that the pressurizing members 31 and 33 are each allowed to move vertically by a given distance. The guide pins each pass through the hole and the tip thereof is inserted to the holes 131 and 132, respectively, in the jig 130.

The remainder of operation and effects of the fourth embodiment are similar to those of the third embodiment.

Figure 17:
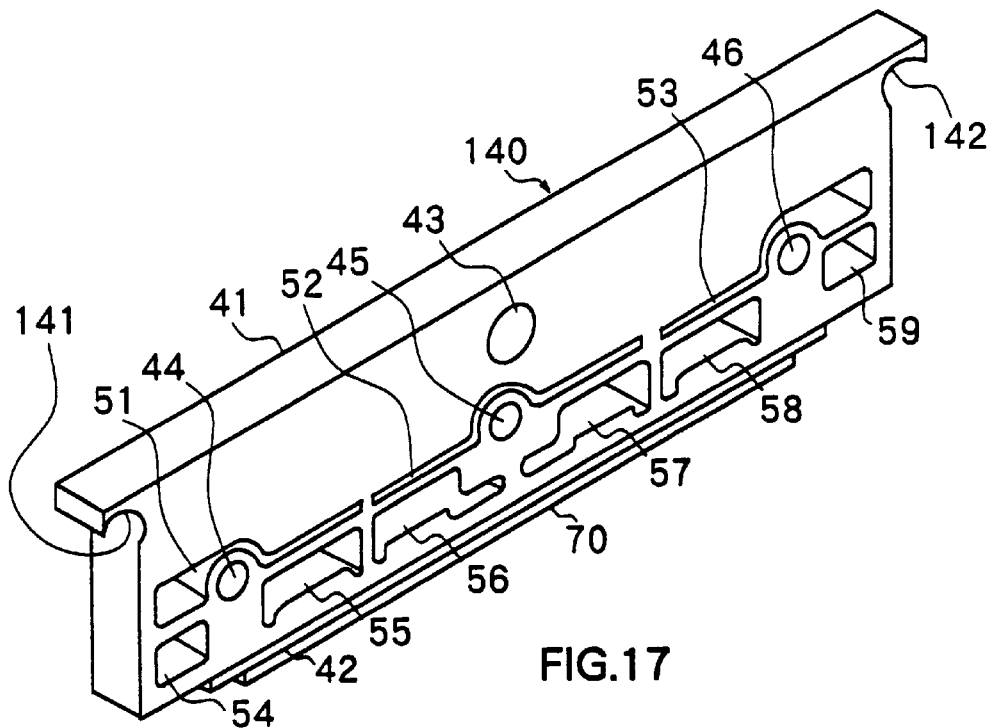
FIG. 17 is a perspective view of a jig of a fifth embodiment of the invention.

FIG. 17 is a perspective view of a jig of a fifth embodiment of the invention. A jig 140 of the embodiment has guide pin engaging sections 141 and 142 at both ends in proximity to the top end of the main body 41. The guide pin engaging sections 141 and 142 each take the form of circular concave facing downward. The remainder of configuration of the jig 140 of the embodiment is similar to that of the jig 40 of the first embodiment.

Figure 18:
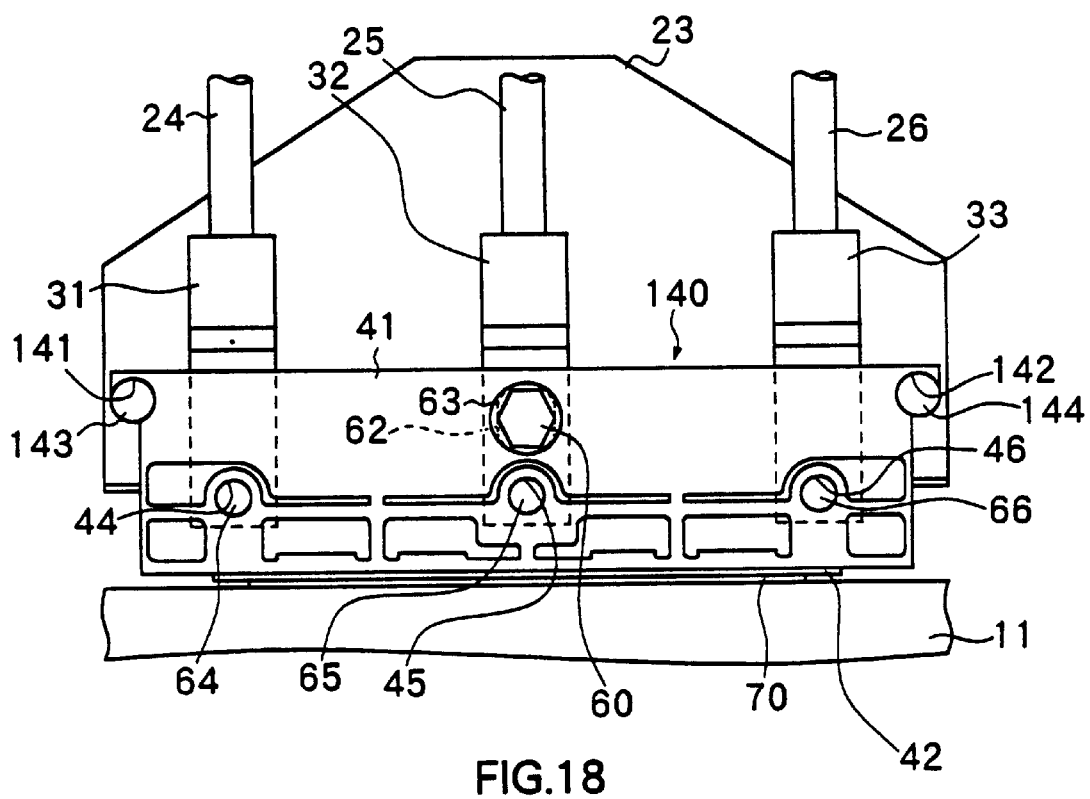
FIG. 18 is a front view of the jig of the fifth embodiment of the invention fixed to the processing apparatus.

FIG. 18 is a front view of the jig 140 fixed to a processing apparatus. In the processing apparatus 1 as shown in the figure wherein the jig 140 is used, guide pins 143 and 144 are provided on the front of the jig fixing plate 23 in the positions corresponding to the guide pin engaging sections 141 and 142 of the jig 140. The size of the guide pins 143 and 144 each correspond to the guide pin engaging sections 141 and 142. The tip of the guide pins 143 and 144 are each engaged in the guide pin engaging sections 141 and 142 of the jig 140. The pressurizing members 31 and 33 do not have holes since the guide pins 143 and 144 do not pass through the pressurizing members 31 and 33 in this embodiment.

With the jig 140 of the embodiment the pressurizing members 31 and 33 in the processing apparatus 1 do not require holes through which the guide pins 143 and 144 are inserted. The structure of the processing apparatus 1 is therefore simplified. The remainder of operation and effects of the fifth embodiment are similar to those of the third embodiment.

Figure 19:
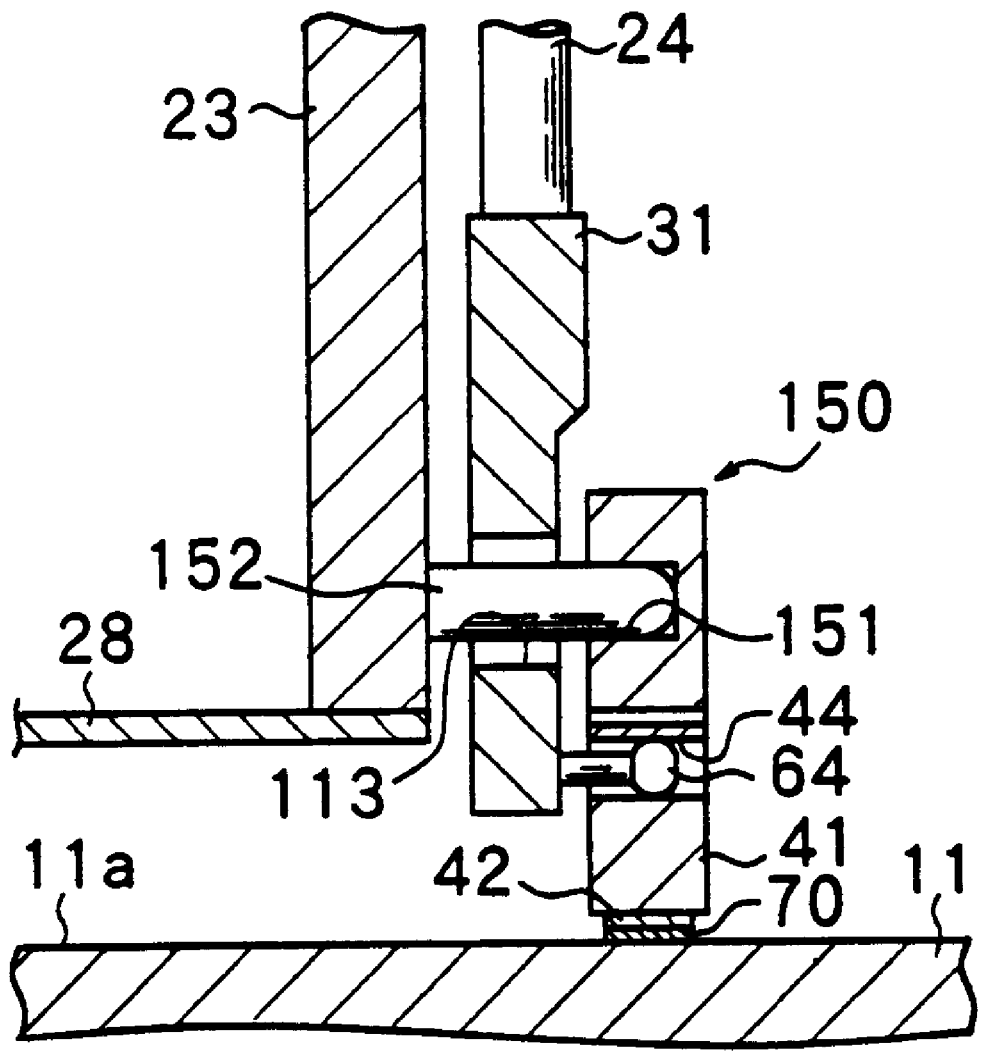
FIG. 19 is a cross section of the jig of a sixth embodiment of the invention fixed to the processing apparatus.

FIG. 19 is a cross section of a jig of a sixth embodiment of the invention. The cross section is taken along the position similar to that of FIG. 14. A jig 150 of the embodiment has a concavity 151 for a guide pin as a rotation preventing means or an engagement of rotation preventing section, instead of the hole 111 in the second embodiment. The concavity 151 opens only on the side of the jig fixing plate 23.

Furthermore, in the processing apparatus 1, wherein the jig 150 of the embodiment is used, a guide pin 152, corresponding to the concavity 151 in diameter, is provided on the front of the jig fixing plate 23 in the position corresponding to the concavity 151 in the jig 150. The guide pin 152 replaces the guide pin 112 in the second embodiment. The guide pin 152 passes through the hole 113 formed in the pressurizing member 31 and the tip thereof is inserted into the concavity 151 in the jig 150.

The remainder of operation and effects of the fourth embodiment are similar to those of the second embodiment.

The present invention is not limited to the embodiments described so far but may be practiced in still other ways. For example, the engaging sections such as the holes for the guide pins as means for preventing rotation or rotation preventing sections may be provided at more than three points instead of one or two points only. Although processing of composite heads each made up of MR head and thin film head is described in the foregoing embodiments, the invention is applicable to processing of thin film heads.

The invention may be applied to any other processing such as polishing and grinding besides lapping.

The invention may be applied to processing of any other object other than magnetic heads.

As described so far, the main body of the processing jig of the invention is fixed to the processing apparatus with the fixing section only at the one point in the main body. As a result, with the jig of the invention the profile regularity of the surface processed of an object fixed to the jig will not be affected by a difference in level between two points in the processing apparatus to which the jig is fixed and bad parallelism as found in a jig fixed to a processing apparatus at two point is avoided. Therefore the jig of the invention improves the profile regularity of the surface processed of the object processed with the processing apparatus and improves yields of objects and reduces inspection steps for the objects.

Furthermore, the fixing section of the processing jig of the invention may be provided in the longitudinal mid-section of the main body of the jig. This laterally symmetrical structure is allowed to be used with either side up. It is thus possible to prolong the lifetime of the jig and to improve the quality and yields of objects.

The jig for processing magnetic heads of the invention may further comprise the rotation preventing section or the means for preventing the main body of the jig from rotating about the fixing section.

Furthermore, in the jig of the invention the fixing section may be provided in the longitudinal mid-section of the main body and the engaging section as the rotation preventing means or section is provided in a plurality of positions symmetrical with respect to the midpoint across the length of the main body. This laterally symmetrical structure is allowed to be used with either side up. It is thus possible to prolong the lifetime of the jig and to improve the quality and yields of objects.

Obviously many modifications and variations of the present invention are possible in light of the above teachings. It is therefore to be understood that within the scope of the appended claims the invention may be practiced otherwise than as specifically described.

What is claimed is:

1. In combination, a processing jig and a processing apparatus, the processing jig retaining an object to be processed with the processing apparatus, the jig comprising:
   a main body including a retainer for retaining the object; and
   a single fixing element provided only in one position in said main body, said single fixing element configured and located to fix said main body to the processing apparatus;
   said processing apparatus comprising a single fixing member that cooperates with said single fixing element to fix said processing jig to said processing apparatus;
   wherein one of said single fixing element and said single fixing member is a single fixing hole, and the other of said fixing element and said single fixing member extends through said single fixing hole and includes a locking element that securely locks said processing jig to said processing apparatus via said single fixing hole such that said processing jig and said processing apparatus cannot be separated from each other.

2. The combination according to claim 1, wherein said fixing element is provided in a longitudinal mid-section of said main body.

3. The combination according to claim 1, further comprising means for preventing said main body from rotating about said fixing element, said means provided in said main body.

4. The combination according to claim 3, wherein said means for preventing includes at least one engaging section, and said processing apparatus includes a rotation preventing member that engages said at least one engaging section.

5. The combination according to claim 4, wherein said fixing element is provided in a longitudinal mid-section of said main body and said means for preventing includes a plurality of said engaging sections provided in a plurality of positions symmetrical with respect to a midpoint across the length of said main body.

6. The combination according to claim 1, further comprising a rotation preventing section for preventing said main body from rotating about said fixing element, said rotation preventing section provided in said main body.

7. The combination according to claim 6, wherein said rotation preventing section includes at least one engaging section, and said processing apparatus includes a rotation preventing member that engages said at least one engaging section.

8. The combination according to claim 7, wherein said fixing element is provided in a longitudinal mid-section of said main body and said rotation preventing section includes a plurality of said engaging sections provided in a plurality of positions symmetrical with respect to a midpoint across the length of said main body.

9. In combination, a processing jig and a processing apparatus, the processing jig retaining an object to be processed with the processing apparatus, the jig comprising:
   a main body including a retainer for retaining the object; and
   a single fixing hole provided in said main body and configured and located in said main body to fix said main body to the processing apparatus;
   said processing apparatus comprising a single fixing member that extends through said single fixing hole and includes element that securely locks said processing jig to said processing apparatus via said single fixing hole such that said processing jig and said processing apparatus cannot be separated from each other.

10. The combination according to claim 9, wherein said single fixing hole is provided in a longitudinal mid-section of said main body.

11. The combination according to claim 9, further comprising means for preventing said main body from rotating about said single fixing hole, said means provided in said main body.

12. The combination according to claim 11, wherein said means for preventing includes at least one engaging section, and said processing apparatus includes a rotation preventing member that engages said at least one engaging section.

13. The combination according to claim 12, wherein said single fixing hole is provided in a longitudinal mid-section of said main body and said means for preventing includes a plurality of said engaging sections provided in a plurality of positions symmetrical with respect to a midpoint across the length of said main body.

14. The combination according to claim 9, further comprising a rotation preventing section for preventing said main body from rotating about said single fixing hole, said rotation preventing section provided in said main body.

15. Thee combination according to claim 14, wherein said rotation preventing section includes at least one engaging section, and said processing apparatus includes a rotation preventing member that engages said at least one engaging section.

16. The combination according to claim 15, wherein said single fixing hole is provided in a longitudinal mid-section of said main body and said rotation preventing section includes a plurality of said engaging sections provided in a plurality of positions symmetrical with respect to a midpoint across the length of said main body.

17. A processing jig for retaining an object to be processed, the jig comprising:

a main body including a retainer for retaining the object; and a single fixing hole provided in a longitudinal mid-section of said main body, said single fixing hole configured and located in said main body to receive a single fixing member of a processing apparatus that extends through said singe fixing hole and locks said main body to the processing apparatus such that the processing jig and the processing apparatus cannot be separated from each other.

18. A processing jig according to claim 17, further comprising means for preventing said main body from rotating about said singe fixing hole, said means provided in said main body.

19. A processing jig according to claim 18, wherein said means for preventing includes at least one engaging section for engaging with one rotation preventing member provided in the processing apparatus.

20. A processing jig according to claim 19, wherein said means for preventing includes a plurality of said engaging sections provided in a plurality of positions symmetrical with respect to a midpoint across the length of said main body.

* * * * *

UNITED STATES PATENT AND TRADEMARK OFFICE
CERTIFICATE OF CORRECTION

PATENT NO. : 6,095,895
DATED : August 1, 2000
INVENTOR(S) : Yasutoshi FUJITA et al.

It is certified that error appears in the above-indentified patent and that said Letters Patent is hereby corrected as shown below:

Col. 1, line 52, change "in disclosed" to --is disclosed--.

Col. 2, line 51, change "making" to --magnifying--.

Col. 4, line 5, change "vertical" to --vertically--.

Col. 4, line 25, change "69" to --59--.

Col. 9, line 26, before "MR" insert --an--, after "and" insert --a--.

Col. 11, line 1, after "includes" insert --a locking--.

Signed and Sealed this

Tenth Day of April, 2001

*Attest:*

NICHOLAS P. GODICI

*Attesting Officer*     *Acting Director of the United States Patent and Trademark Office*